(12) United States Patent
Ruan et al.

(10) Patent No.: US 8,346,390 B2
(45) Date of Patent: Jan. 1, 2013

(54) SINGLE WHEEL ROBOT SYSTEM AND ITS CONTROL METHOD

(75) Inventors: Xiaogang Ruan, Beijing (CN); Qiyuan Wang, Beijing (CN); Jingmin Hu, Beijing (CN); Naigong Yu, Beijing (CN); Yufeng Wang, Beijing (CN)

(73) Assignee: Beijing University of Technology, Beijing (CN)

( * ) Notice: Subject to any disclaimer, the term of this patent is extended or adjusted under 35 U.S.C. 154(b) by 393 days.

(21) Appl. No.: 12/774,578

(22) Filed: May 5, 2010

(65) Prior Publication Data
US 2011/0010013 A1  Jan. 13, 2011

(30) Foreign Application Priority Data
Jul. 8, 2009 (CN) .......................... 2009 1 0088708

(51) Int. Cl.
*B62D 61/00* (2006.01)
(52) U.S. Cl. .............................. 700/245; 901/1; 180/252
(58) Field of Classification Search .................. 700/245, 700/261; 901/1; 180/8.3, 252–267
See application file for complete search history.

(56) References Cited

U.S. PATENT DOCUMENTS

| 4,365,437 A * | 12/1982 | Jameson ........................ 446/355 |
| 6,247,546 B1 * | 6/2001 | Spletzer et al. ................. 180/8.5 |
| 6,752,400 B2 * | 6/2004 | Nakatsukasa et al. ......... 280/5.2 |
| 6,853,877 B1 * | 2/2005 | Slater et al. .................... 700/245 |
| 6,865,447 B2 * | 3/2005 | Lau et al. ....................... 700/258 |
| 2006/0243499 A1 * | 11/2006 | Hosoda .......................... 180/8.5 |
| 2007/0257451 A1 * | 11/2007 | Furuta et al. ............... 280/5.501 |

* cited by examiner

*Primary Examiner* — Paul N Dickson
*Assistant Examiner* — Timothy Wilhelm
(74) *Attorney, Agent, or Firm* — J.C. Patents

(57) ABSTRACT

This invention relates to a single wheel robot system and its control method. The robot is an intelligent self-control and thus self-balancing unicycle riding robot. The control method is the balance control method of the static imbalance unicycle robot. The single wheel robot includes mechanical body and control system; the body contains a single wheel in the substructure which can rotate around for balance; the control system comprises state sensors, motion controller, servo-driven controllers, and a power system. Among them, the motion controller receive signals from the state sensors, in accordance with control procedures for processing of the received signal, thereby issuing control instructions. The servo drive controller receives the control instructions and controls the motors of the robot to adjust posture to be balanced.

6 Claims, 7 Drawing Sheets

SINGLE WHEEL ROBOT SYSTEM AND ITS CONTROL METHOD

CROSS-REFERENCE TO RELATED APPLICATION

This application claims the priority benefits of Chinese application No. 200910088708.6 filed on Jul. 8, 2009, the content of which is hereby incorporated by reference in its entirety.

BACKGROUND OF THE INVENTION

1. Field of the Invention

This invention relates to a single wheel robot system and its control method. The robot is an intelligent self-control and thus self-balancing unicycle riding robot. The control method is the balance control method of the static imbalance unicycle robot.

2. Description of Related Art

Riding unicycle is complicated activity requiring a lot of advanced skill of balance. To obtain such capacity special study and training are needed. The study of autonomous robots which can imitate riding unicycle is the drive of such invention regarding self-control unicycle riding robots.

A single wheel robot is designed to imitate the activities of people riding a single wheel bicycle. The emergence of the bionic robot system is a result of rapid development and integration of artificial intelligence, intelligent control, machine design, robotics, and other related areas. A single wheel robot has obvious dynamic balance features different from a static balance robot. A single wheel robot has broad application prospects: With the complexity of its own unique balance of control problems, it can be used as a platform for unique features and tools in scientific research, display and entertainment; With its dynamic balance properties, it would be applied to complex terrain environment, for transport, rescue and detection; With its slim shape it would be used as monitoring robots, to realize the monitoring of narrow spaces; In the aerospace field, a special lunar vehicle can even be developed based on a single wheel robot.

Compared to the static balance robot (such as the four wheels mobile robot), a single wheel robot has the following salient features: 1) The robot's movement is based on the process of achieving a state of balance, that is, robots must be stabilized before they can carry out other movements. So this movement is a dynamic balancing process; the robot adjusts constantly in the vicinity of equilibrium point to maintain balance. While this increases the difficulty to control the robot, this enables the robot to complete many complex movement tasks of balance; 2) Since there is only one wheel, the hardware of a single wheel robot is simpler, lighter, the motion of the robot is also more flexible; 3) If robot arms, dexterous hands, a head, etc. are added to the robot body, the robot can be in a unique way to achieve the appropriate dynamic balance tasks, such as cycling in a very narrow path, riding off a very narrow beam, turning around in-situ, or even completing the difficult action of high-wire like a person.

The existing single wheel robots have mostly only driver and control layer on the robot's body as the basic functions, there is no sound macro-planning and visual functions, or the ability of transmitting information that needs to be processed to a host computer for processing. The robot does not have the ability to process such information either. For example, the robot "Murata Girl", height 50 cm, weight 5 kg, speed of 5 cm/s, developed by Japan's Murata Manufacturing unicycle ride. For the control, the balance in left and right direction (roll) is kept through vertically rotating an inertia wheel of the robot body. For the front and rear direction (pitch), the motor of the body rotates the unicycle wheel through the chain of transmission to maintain balance. For the measurement, a tilt detecting gyro sensors is equipped in order to control the balance in two directions, respectively. In addition, it is equipped with ultrasonic sensors to detect obstacles, a blue tooth module to send and receive control instructions, a ceramic oscillator, the NTC Thermistor to test the temperature, etc. But "she" has no mechanical arms and dexterous hand to perform some tasks, and still has no ability of carrying out complex task such us visual mission. She transmits the information to the host computer for processing and lacks the flexibility to expand Debugging with castors components. Her wheel is the complicated chain drive mode. Her detection in only four single-axis gyro will produce the angle integral migration issue, and ultimately lead to system instability.

SUMMARY OF THE INVENTION

In view of the above problems, this invention has designed a robot that can ride unicycle, and put forward a single wheel balancing robot motion control method. The robot system not only can be used as an open platform for intelligent robotics research and development of control science, robotics, artificial intelligence and other fields of research and teaching of subjects, but also can be an instrument with unique features in entertainment and exhibition.

In order to achieve the above objectives, the invention has taken the following technical solutions:

Design a single wheel robot system, including a mechanical body and a control system; the mechanical body including the lower balance components with a balanced single wheel (14) and an adjustable upper and lower bracket (13) for debugging; the upper balance components include the inertia flywheel (17) and the flywheel motor (18); the control system consists of state sensors, a motion controller (10) and two servo drive controllers and power supply system, wherein the state sensors include attitude sensors and speed sensors. Motion controller (10) receives a signal from the state sensors and then issues control instructions through control procedures and the signals. The two servo-drive controllers receive the control instruction, respectively, and, through the single wheel motor (12) and flywheel motor (18), control rotation of the single wheel (14) and the inertia flywheel (17) to balance the robot.

Under the debugging support (13), all around, each direction set has a removable castor 15.

The inertia flywheel (17) is pairs of removable structure, consists of two semicircular side by side. The mechanical body of the robot of the present invention includes an aluminum frame rigid body, modular robotic head and neck consisting of two-dimensional PTZ, a detachable robot arm (6). The end of the arm (6) is provided with a multi-fingered robot hand (7). The upper balance components and the lower balance components constitute the balance control structure, in which the lower balance components include a balanced single wheel (14) and a single wheel motor (12). The upper balance components include the inertia flywheel (17) and the flywheel motor (18). The attitude sensors of the control system are inclinometer (19) and Gyro (20); the speed sensor is the encoders installed on the single wheel motor (12) and the flywheel motor (18); the motion controller (10) MTS2812 is a digital signal processor card; the servo drive controllers are ACJ-55-18 servo drives; the power supply system is the power supply board (5) and the rechargeable Lithium batteries module (9).

The robot's perception sensors also include a dual-camera vision sensor (1) installed in the robot's head, an MIC constituting a hearing sensor and an infrared sensor (2) located between the pairs of cameras, and sonar sensors (11) installed in the robot waist, a remote control receiver, etc;

The main controller (3)-EPC can receive information of the motion controller (10)-DSP and auxiliary controller-MCU information, and provide control instructions for the motion controller (10) and pass voice command to the speaker (16).

The robot castors are mainly used for supporting the static and fixed body structure, when necessary they can be removed or lifted. Robot motion control methods are as follows:

1) Master controller (3) computes the robot straight and yaw rate control commands and issues the commands to the motion control device (10) to implement in accordance with soft procedures or according to commands from the remote control instruction of user, and the feedback of sensors, through the decision-making algorithm. Its decision-making algorithm consists of the following steps to complete: Action generator, refer to the user command or ultrasonic distance measurement information to calculate expectations of straight and yaw rate control commands, and then the decision-making device (motion controller) determines whether the implementation of the expectations of control commands according to the status of robot posture. If the robot is balanced, the expected control commands turn into the actual control commands; or the instruction of the master controller will not become the actual control command and the actual control command will be zero, that is, first adjust the robot balance, then carry out the instruction; The command Generator Optional: look-up table, dynamic programming, fuzzy logic or expert system and so on.

2) In a motion control cycle, the motion controller (10) reads the feedback signal of the inclinometer on the robot base (19), gyroscopes (20), and compares the value of zero inclination angle to calculate the error signal of the angle and angle speed; the feedback signal obtained by the following steps: motion controller (10) multiply acquires output signals of the inclinometer (19) and the Gyro (20), and DSP calculates the feedback signal through signal processing algorithms 3) Motion Controller (10) reads the feedback signal of motor encoders, calculates robot speed, and derives error signal through comparing the control command given by the main controller (3);

4) According to the error signal, Motion Controller (10) calculates the control value of motors according to the balance control algorithm and then sends to the servo drive controller; The motion balance control algorithm: with the use of decoupling control theory, the inclination will be decomposed to the robot's pitch degree of freedom and the roll degree: $Angle_{FB}$, $Angle_{LR}$ and the angle speed $AngleV_{FB}$, $AngleV_{LR}$, and then use the established PID control algorithm, or fuzzy control, or the LQR, or a pole placement algorithm, or robust control algorithm, or other control algorithm to obtain the required Control value: $U_U$, $U_D$. And then control each motor to control the single wheel—$M_D$, the inertia flywheel motor—$M_U$;

5) Servo drive controllers (12) control the flywheel motor (18) and the single wheel (14) motor in the debug bracket (13), then the motors drive the inertia flywheel balancing component (17) and the single wheel (14), the movement of the wheels adjust the robot balance and exercise the prescribed command; the motor armature current feedback loop achieves the motor torque control. The servo control cycle is far less than the robot motion control cycle.

After removed the forward and back casters (15) of the debugging support (13) and left the other casters (15) in the same horizontal line, the robot turns into a forward and back balance robot with the single wheel (14) like a Pendulum robot. Above control methods can also be: after removed the left and right casters (15) of the debugging support (13) and left the other casters (15) in the same horizontal line, the robot turns into a left and back balance robot with the single wheel (14) or an autonomous robot riding a bicycle. The robot can work properly in mini mode retaining only the robot mechanical ontology in the trunk, the overall balance of the control structure, inclinometer (19), gyroscopes (20), the encoder, MTS2812 digital signal processor board and two servo drives ACJ-55-18 of the control system, power supply board (5) and rechargeable battery module (9). The smallest structure robot control method is only for the motion controller (10) and the servo drive controller. The control programs run on the motion controller 10 respectively and servo drive controller 4, 8 of single wheel and flywheel for all the balance of the robot. The control program of motion controller 10 and the servo drive controller are as follows:

(1) The Program in the Motion Controller (10):

Proceedings do some necessary initialization to complete the variables and DSP registers initialization at first. The main configuration will be taken in the I/O ports and A/D channel, general purpose timers T1-T4, one cycle of the timer T1 for the interruption, T2, T4 for the encoder counters, T3 for the PWM signal output compare timer; and then open the PWM output to send to the servo drive controller enable signal; finally, to an infinite loop wait for interrupt arrival of each loop control procedures implemented in the detection and control algorithms;

When T1 timer expires 25 ms interrupt, DSP responses to the interrupt, save the current procedures for the scene, goes the timer interrupt program, the process (control program) are:

1) Close timer T1 interrupt, ready to start;
2) Obtain the information of all Encoders. Each encoder output signal is two sets of orthogonal coding sequence, the orthogonal encoder pulse circuit of DSP capture these two sets of signal. Rising and falling edges are counted. As a result the clock frequency is four times each input sequence. So after reading the values of the general-purpose timers T2 and T4, divide them by four, to get the number of encoder pulses output $n_u$, $n_d$ in a cycle;
3) Calculate the cumulated straight-line displacement of the robot and the linear speed: the angle of each wheel can be calculated by the information from the encoder during the cycle. Due to control cycle is very short (25 ms), the speed of wheels $\omega=\phi/T$ and the straight-line speed $V_x=\omega \cdot R/2$ of wheels can be approximately calculated. R stands for the wheel radius. Because the control cycle is very short, Multiply accumulate the product of $V_x$ and T of the control cycles and the accumulated linear displacement, to the current accumulation of linear displacement can be acquired, that is $x(t)=x(t-T)+V_xT$;
4) The analog voltage signal is converted to digital by an A/D converter. In order to avoid the incidental factors, each of the signals is continuously sampled 10 times for A/D conversion. Remove the maximum of which and the minimum value, the average is assigned to the corresponding voltage variables: $U_{\theta_1}$, $U_1$, $U_{\theta_2}$, $U_2$. A degree of freedom is calculated on the inclination, through the formula: $\theta=(U_\theta-U_0)/S_2$. $\theta$ is the corresponding robot's tilt angle. $U_\theta$ is the calculated mean voltage. $U_0$ is a zero voltage, $S_2$ is the sensitivity of the inclinometer (19).

5) The inclination angle speed $\dot\theta$ can be obtained through the SPI.
6) The PWM duty cycle corresponding the torque of two control motor can be acquired through the motion control algorithms, the control command $X^C$ as a reference input; the x, $V_x$, $\theta_1$, $\dot\theta_1$, $\theta_2$, $\dot\theta_2$ as state feedback. The absolute value of the scope of torque: [0, 6] (Nm), corresponding to 0~100% duty cycle. When the duty is greater than zero the motor turns the positive. When the duty is less than zero the motor turns the negative. The algorithm of movement balance control as follows:

a) Establish the robot mathematical model, according to the robot mechanical system characteristics and parameters. linear state space equation can be acquired by linearization around the equilibrium point:

$\dot X = AX+Bu$

Where $X=[\theta_2, \theta_1, \omega, \eta, \dot\theta_2, \dot\theta_1, \dot\omega, \dot\eta]^T$, $u=[\tau_d, \tau_u]^T$, $\theta_1$ for pitch angle; $\dot\theta_1$ for pitch angle velocity; $\theta_2$ for roll angle; $\dot\theta_2$ foe roll angle velocity, $\omega$ for the wheel rotation angle, $\dot\omega$ for the wheel rotation angular velocity, $\eta$ for the inertia flywheel (17) rotation angle, $\dot\eta$ for the inertia flywheel (17) angular velocity.

$$A = \begin{bmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 24.9770 & 0 & 0 & 0 & 0 & 0 & 0 & 0 \\ 0 & 60.9590 & 0 & 0 & 0 & 0 & 0 & 0 \\ 0 & -108.3715 & 0 & 0 & 0 & 0 & 0 & 0 \\ -24.9770 & 0 & 0 & 0 & 0 & 0 & 0 & 0 \end{bmatrix}$$

$$B = \begin{bmatrix} 0 & 0 \\ 0 & 0 \\ 0 & 0 \\ 0 & 0 \\ 0 & -1.4159 \\ -14.3988 & 0 \\ 40.4128 & 0 \\ 0 & 134.7493 \end{bmatrix}$$

b) That the system is completely controllable can be proved through obtaining that the control matrixes of the pitching motion subsystem and roll movement subsystems are full rank. The value of each state variable of the system can also be measured.

c) By decoupling control theory, the whole robot system control tasks can be decomposed into pitch degree of freedom to control and roll degree of freedom to control. And therefore, $\theta_u^C$, $\theta_d^C$ is reference input for the two subsystems, respectively, the state $\theta_i$, $\dot\theta_i$ (i=u,d;), That is the inclination of two DOF as the feedback of the balance control system. The two inner angle control subsystem of the state feedback controller can be designed by PID control method: PID control parameters can be acquired by the critical shock method. As:

Tilt inner degrees of freedom control: $\begin{cases} K_p^u = 6000 \\ K_i^u = 3 \\ K_d^u = 5200; \end{cases}$ Roll degrees of freedom control: $\begin{cases} K_p^d = 20000 \\ K_i^d = 3 \\ K_d^d = 20000 \end{cases}$ The PID control parameters of the robot outside the closed-loop displacement control can be obtained in the same method:

Outer $X$(distance) Control: $\begin{cases} K_p^x = 0.02 \\ K_i^x = 0 \\ K_d^x = 0.148; \end{cases}$ 1) Refresh the output of the PWM duty cycle to the servo drive and the motor rotation direction;
   1. Set timer T1, re-start 25 ms timing, set T2, T4, re-start counting;
   2. Open T1 interrupts, exit interrupt control procedure;
(2) The Servo Drive Controller Control Program:

The servo drive ACJ-55-18 supporting PC-side software COPLEY MOTION2, automatically calculate the DC motor servo program PI regulator parameters according to input parameters. The servo-control procedures is automatically generated after the simple structure of control system setting and downloaded to the storage unit of ACJ-55-18 through the serial port. The servo process control cycle is 1 ms. Signals of DSP-output PWM and turn were motor reference torque and reference shift. The armature current is negative feedback. The overall control loop of motor torque is PID servo control.

Compared to existing static equilibrium robot, such as s the four wheels mobile robot, the invention provides a control platform for robotics research, the field of control science, intelligent control and other multi-disciplinary research and teaching. And it has the following advantages:

1) 2 coupled degrees of freedom make non-linear and uncertainty of the system increase, and more suitable for nonlinear control, robust control, intelligent control and learning control research. The adjustable bracket for debugging robot can not only change the height of the support caster 15, but also can turn the robot into equivalent of three front-line mobile inverted pendulum like self-balancing "Segway" scooter, or self-balancing bicycle-riding robot like "Murata Boy" after the castors 15 of one of the degrees of freedom removed.

2) Control systems can be classified into three main control layer: 1, main controller (3) 2, motion controller (10), 3, servo-driven controller. Such three-level hierarchical control structure is in line with biotechnology. All controllers carry out their duties, integrating the robot with high processing ability and intelligence level. A lot of kinds of complex control algorithms, motion control skills and learning of other intelligent behavior can be effectively carried out.

Modular design concept makes the robot structured, every part of the robot is removable and replaceable except the smallest components of the system for system maintenance or upgrades. This provides a great convenience to user's flexible demand. Such as: visual sensor systems and voice processing systems may be added to run the visual recognition, speech recognition function; a remote control system and obstacle avoidance systems can be equipped to provided the robot with a remotely operated and autonomous obstacle avoidance ability.

Figure 1:
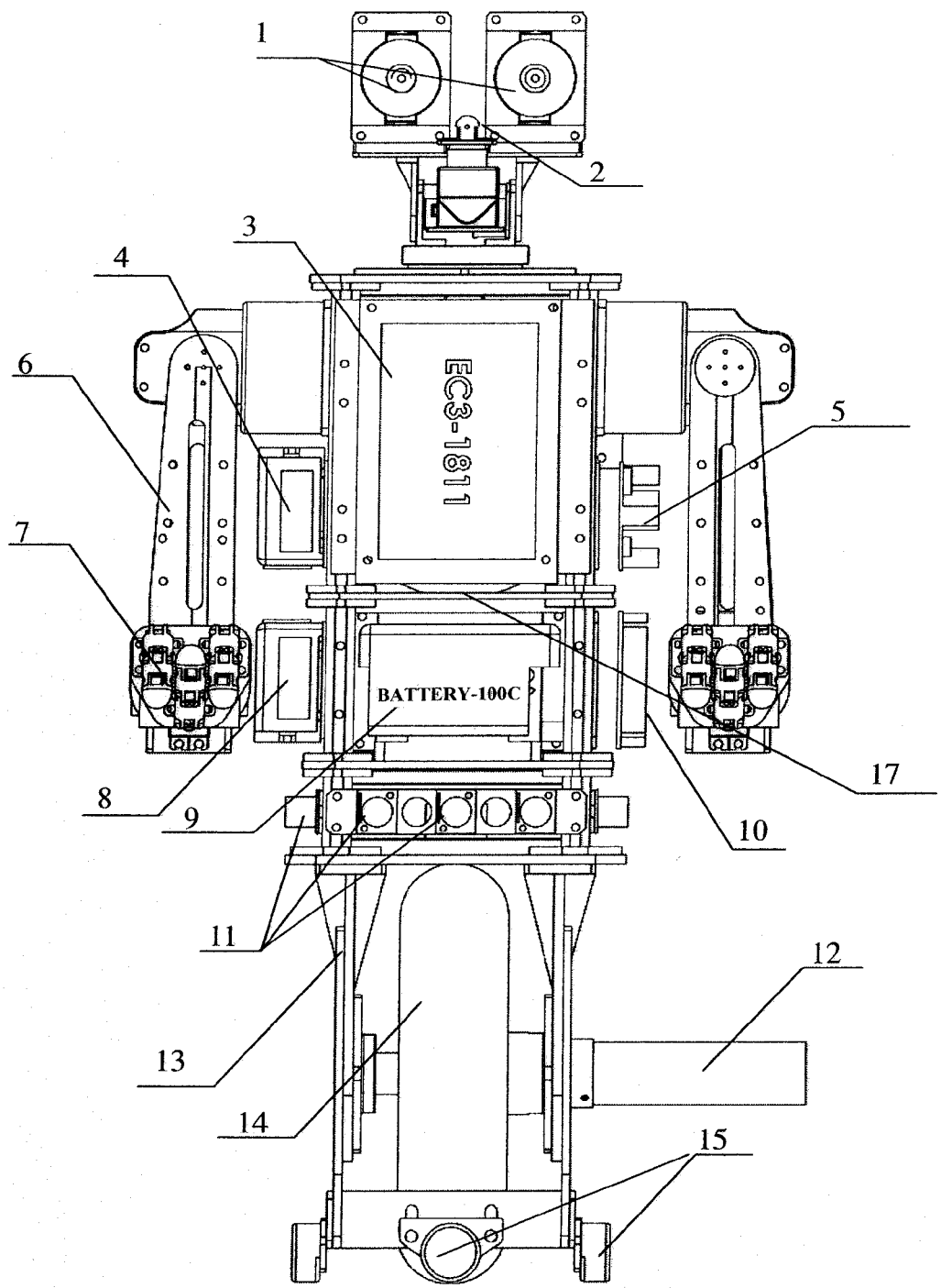
FIG. 1 is the main view of a single wheel robot's mechanical structure.
Figure 2:
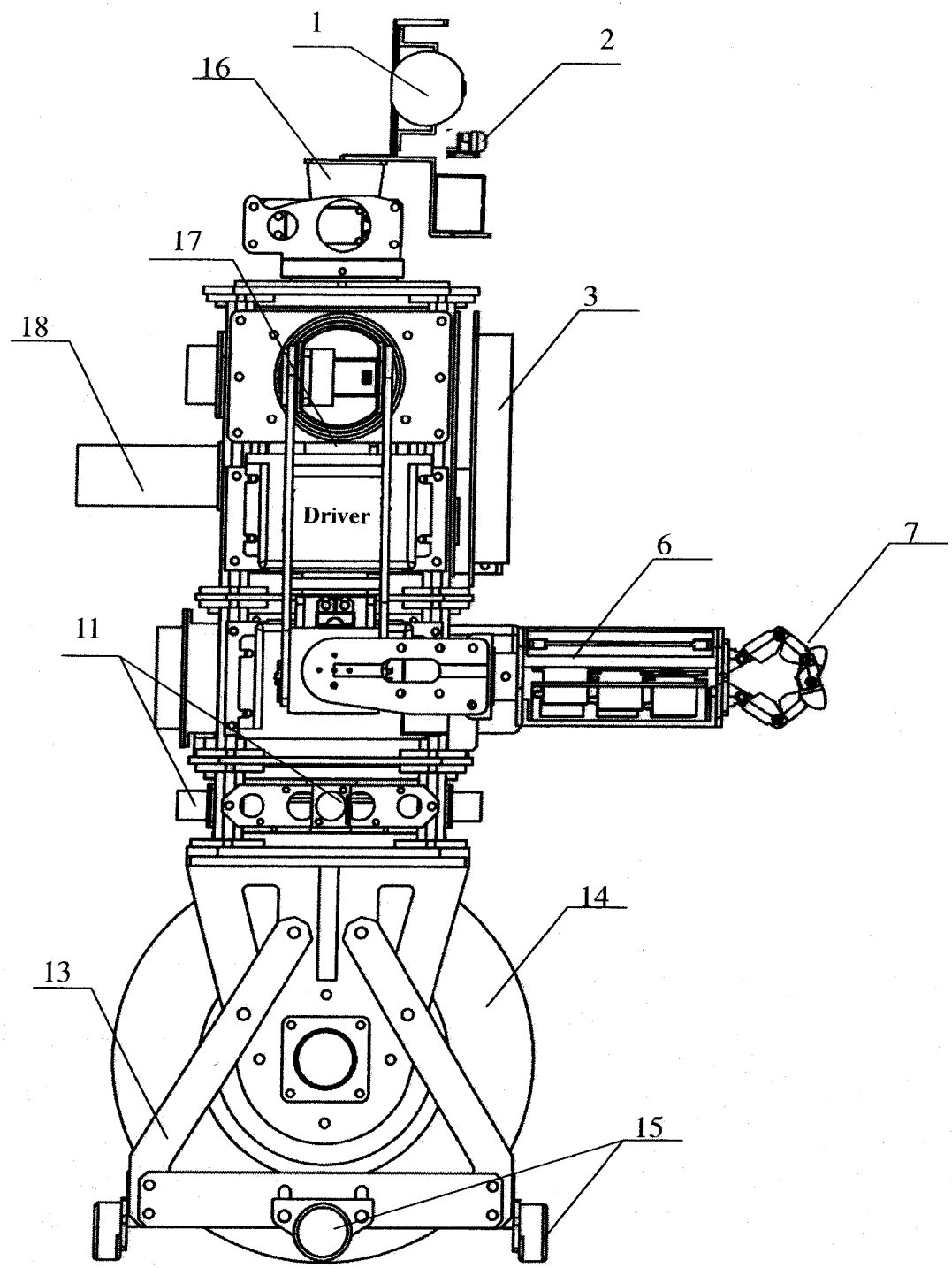
FIG. 2 is the side view of the mechanical structure of the single wheel robot.

In the figure: 1, vision sensors; 2 infrared sensors; 3, host controller; 4, flywheel servo drive controller; 5, power board; 6, arm; 7, mechanical hands; 8, Single Wheel servo drive controller; 9, rechargeable battery module; 10, motion controller; 11, sonar sensors; 12, single wheel motors; 13, debug bracket; 14, Single Wheel; 15, Castor; 16, speakers; 17, inertia flywheel; 18, flywheel motor; 19, Inclinometers; 20, gyroscopes.

DESCRIPTION OF THE EMBODIMENTS

The detailed description of this invention in combination with FIG. 1-FIG. 7 is as follows:

The autonomy unicycle riding robot system of the invention includes a mechanical body and electrical systems (control systems), in which the overall structure of the machine body comprises:

Trunk: Aluminum alloy rigid robot body.

Head and neck: two-dimensional PTZ modular. The head of robot can be up and down or rotated.

Arm 6 and hand 7: replaceable, modular, multi-fingered mechanical hand to complete the operant task.

Overall balance structure of the control: the lower balance components (the lower shaft components, mainly for single wheel) and the balance of components (the upper shaft components, mainly inertia flywheel) of a vertical installation structure.

Design principles: modular design ideas: each component is a unit, can easily be replaced. For example, the robot's head can be with two-dimensional degrees of freedom installed with binocular vision, hearing and speaker 16. The modular head can also be installed with a monocular visual function. Replacement of the two only needs to remove the four screws fixing the head, and then the head can be replaced with a new modular. Arm 6, hand 7, sonar and other sensors 11 are modular designed and replaceable. Inertia flywheel 17, single wheel 14, debug bracket 13, and all other designed part can be replaced, or changed in height; motor size can also be replaced. The space for replacement is reserved. Different modules can be completely universal if they meet the standard interface. Replacement is very simple.

Machine body of the robot includes eight major components:

1. Robot base components: installation of attitude sensors (including the inclinometer 19, gyroscope 20).

2. Waist components: installed rechargeable battery module 9 and the sonar sensors 11 (8-12 pieces) around the waist, and the remote control receiver.

3. Upper body components: installation of an organized-class main controller 3: EC3-1811 industrial computer, the control-level motion controller 10: MTS2812 digital signal processor board, the control-level auxiliary controller: MPCE061A development board, flywheel and Single Wheel servo drive controller 4, 8; 2 servo drives ACJ-55-18, power supply card 5, as well as USB-Serial Communication Module Visual USB_RS232 module.

4. Lower balance components (lower the shaft components) includes: single wheel 14, Single Wheel motor 12, reducer, encoder (speed sensor), as well as ball bearings and so on. Single Wheel 14 fixed forward and backward (the shaft of single wheel 14 was fixed left and right), to achieve the forward direction movement of robot and balance control of the ride.

5. Upper balance of components (upper the shaft components) includes: inertial flywheel 17, the flywheel motor 18, the reducer, the encoder (speed sensor), as well as ball bearings and so on. The Inertia flywheel 17 is fixed left and right direction to balance Left direction of the robot of the roll DOF.

6. Head components: vision sensor 1, auditory sensors, infrared sensors 2, acoustic devices (speakers 16), robotic neck with raw and pitch degrees of freedom control of steering two-dimensional PTZ and so on can be installed.

7. Arm components: robot arm 6 with four degrees of freedom.

8. Dexterous hand components: dexterous hand 7 with 9 DOF and three-fingered manipulator in the end of the arms.

Among them, 1, 2, 3 constitute a robot trunk, 1, 2, 3, 4, 5 constitute the basic structure of the robot.

Electrical system is mainly divided into: sensory systems, control systems, power system.

Sensory system is the robot's "eyes", "ears" and other components of access to outside information, including: vision sensors 1, infrared sensors 2, sonar sensors 11, attitude sensors, speed sensors, auditory sensors, remote control receiver.

The vision sensor in front of a robot is used to detect visual images, capture image information transmitted to the brain (organizational level) for processing;

Infrared sensor 2 detects whether there is human activities in the front. The implementation of the case uses infrared micro-sensor module of human KT-0003B.

Sonar sensors 11—ultrasonic sensor 11, installed in the robot's waist is equivalent to bat's mouth and ears. When they work, the robot can take advantage of the sensor to measure the distance of the object around, which may form a barrier sonar systems, and then complete the obstacle avoidance task;

Attitude sensors—inclinometer 19 and gyroscopes 20, inclinometer 19 for detecting the robot relative to the upright position tilt angle and roll angle. Gyro 20 is used for detecting the velocity of the inclination. Both provide important state information for the robot.

Speed sensor is installed in the end of motor as the optical encoder or magnetic encoder. The speed sensor converts speed signals into electrical signals sent to the motion controller 10. The implementation of the case uses a magnetic encoder as a speed sensor.

Auditory sensors—Receive audio signals, such as the human voice signals. MIC in this case is used as Hearing sensor, integrated in camera.

Remote Control Receiver—Receive temporary remote control directives.

Control system is the nerve network of the robot, which uses a variety of signal provided by sensory system to process and map, finally issues a variety of real-time robot motion commands. It includes the drive-level muscles of the robot (servo drive controller and motor), the control-level cerebellum (motor controller) and the organizational level central nervous system (primary controller). Among them, the flywheel, the single wheel motor and the servo drive control system are equivalent to the muscle; the digital signal processor (DSP)—balance and motor control centers, and the support management system are equivalent to the cerebella control system—the motion control device (10) and the auxiliary controller; the industrial control computer (EC3-1811) as a macro-planning and management of the central nerve center is equivalent to the brain of the robot, that is the main controller (3).

The power system is equivalent to the digestive system of the robot, which provides all energy for the robot to think and move. The power system mainly is the power supply board (5) and rechargeable batteries (9).

The main controller (3) is Embedded Computer (EPC) systems, such as EC3-1811 Industrial Computer.

Motion controller 10 is a digital signal processor (DSP) system.

The auxiliary controller is a microcontroller (MCU), DSP or other embedded systems.

The servo drive controller uses servo drive—ACJ-55-18.

The flywheel, the single wheel motors can choose a DC torque motor with reducer, DC brush motors or brushless DC motor.

Power system: Rechargeable Battery Module (9) uses lithium batteries LBS-100C, power supply board five is PW4512.

The connection between the electrical system is described as follows: the main controller (3) connects with motion controller (10), the auxiliary controller and input and output devices such as a vision sensor, infrared sensors, auditory sensors (MIC), speaker (16) (audible devices); motion controller (10) connects with inclinometer (19), gyroscope (20), encoders, the servo drive controller; the auxiliary controller connects with ultrasonic sensors and the remote control receiver (integrated with assistant controller); rechargeable battery module (9) and board (5) are the power supply of all electrical equipment.

Figure 4:
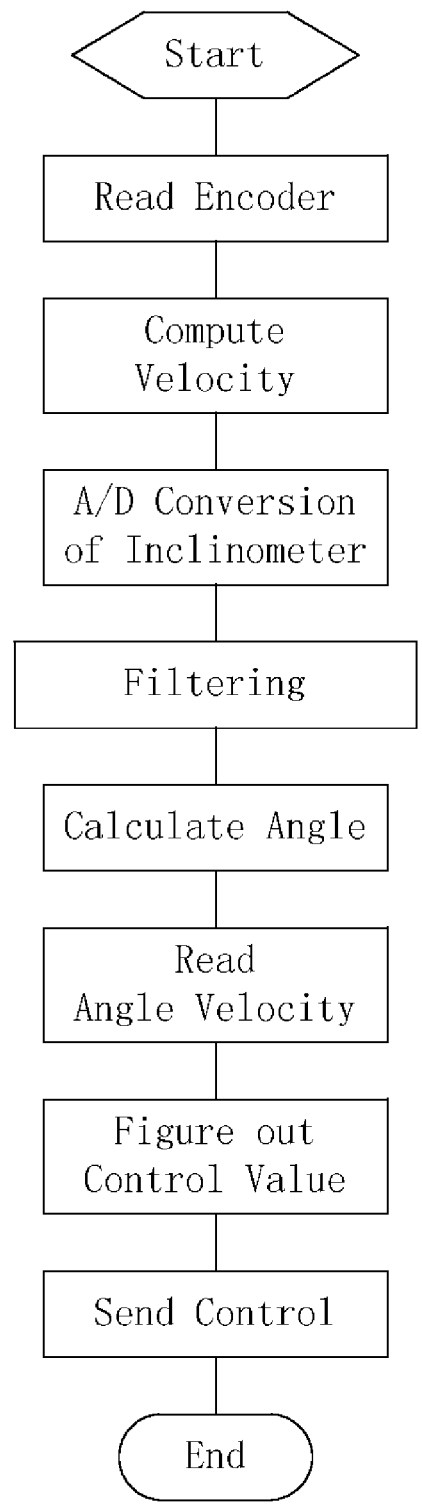
FIG. 4 is the main program flow chart of the single wheel robot's motion controller.

Shown in FIG. 4, the robot motion control method: the main controller (3) receives data from input devices (remote control receiver) of the user operating instructions; monitors the sensor feedback information; from time to time refers to the user operating instructions and sensor feedback, calculates the robot straight and yaw rate control commands through the decision-making algorithm, issues to the motion controller (10) implementation; in a motion control cycle, the motion controller (10) reads the feedback signal of the inclinometer (19), gyroscope (20), and compares the value of zero inclination angle and inclination error signal; motion controller (10) reads the motor encoder feedback signal, calculates a robot straight and yaw rate, compares with the control commands given by the main controller (3), derives an error signal; accordingly, the motion controller (10) sends the error signal to the servo drive controller; the servo drive controller controls the motors of the flywheel and single wheel; the motors drive inertia flywheel (18), single wheel (14) to maintain the robot body balance and exercise in the prescribed manner:

The instructions of main controller (3) may be either real-time command, such as the remote control, etc. It can also be stored instructions, such as the program memory of the sequence of movement, etc. It can be both action commands, such as forward, turn, etc. It can also be a task-based instruction, such as the autonomous obstacle avoidance operation, etc.

Main controller (3) communicates with the motion controller (10) to read feedback information of inclinometer (19), gyroscope 20 and the encoder. It communicates with the auxiliary controller to obtain ultrasonic sensor feedback and remote input commands;

Master controller (3) computes the robot straight and yaw rate control commands and issues to the motion control device (10) to implement in accordance with soft procedures or according to commands from the remote control instruction of the user, and the feedback of sensors, through the decision-making algorithm. Its decision-making algorithm consists of the following steps to complete: Action generator, refer to the user command or ultrasonic distance measurement information to calculate expectations of straight and yaw rate control commands, and then the decision-making device (motion controller) determines whether the implementation of the expectations of control commands according to the status of robot posture. If the robot is balanced, the expected control commands turns into the actual control commands; or the instruction of the master controller will not become the actual control command and the actual control command will be zero, that is, first adjust the robot balance. Then carry out the instruction; The command Generator Optional: look-up table, dynamic programming, fuzzy logic or expert system and so on.

Motion controller 10 collects inclinometer (19) and the gyro (20) output signal through the module (A/D) conversion and SPI ports, and after filtering, signal processing algorithms, provide the feedback signal used in a control cycle of.

Balance control algorithm of motion controller (10): With the use of decoupling control theory, the inclination will be decomposed to the robot's pitch degree of freedom and the roll degree: $Angle_{FB}$, $Angle_{LR}$ and the angle speed $AngleV_{FB}$, $AngleV_{LR}$, and then use the established PID control algorithm, or fuzzy control, or the LQR, or a pole placement algorithm, or robust control algorithm, or other control algorithm to obtain the required Control value: $U_U$, $U_D$. And then control each motor to control the single wheel—$M_D$, the inertia flywheel motor—$M_U$. And then controls motors to control the movement of single wheel (14) and the flywheel motor 18.

Servo drive controllers use armature current as feedback to achieve the motor torque control, servo control cycle is far less than the robot motion control cycle.

Figure 7:
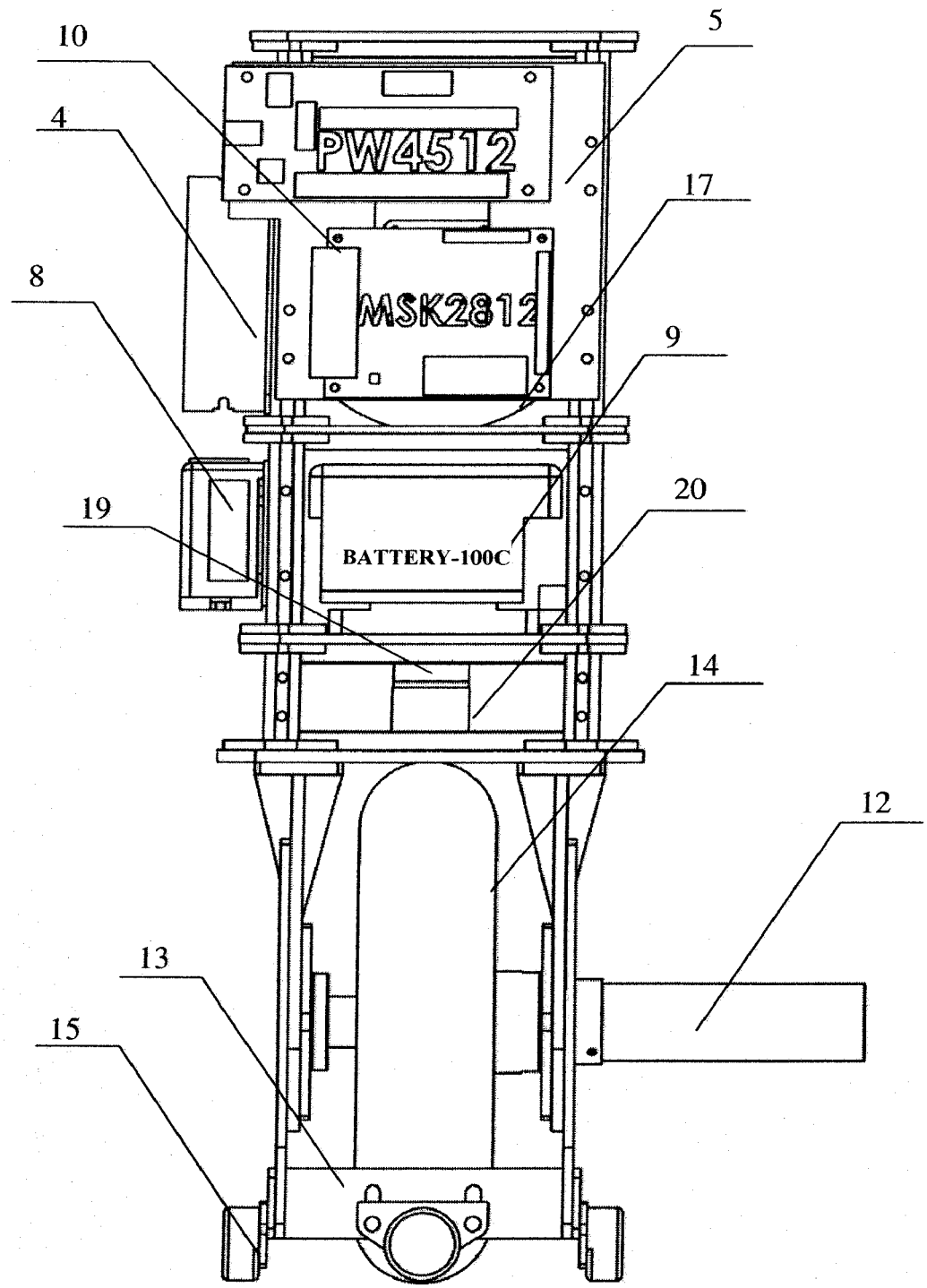
FIG. 7 is the main view of the minimum system architecture of the single wheel robot.

The above control method is suitable for removal of all castors—the situation of only the single wheel, also suitable for removal of some pairs of castors. When front and rear casters removed, this system is an inverted pendulum. Control method of an inverted pendulum can be used. The above-mentioned control method can also be used. Here are the minimum system implementation cases of the present invention. (The smallest structure of the system as shown in FIG. 7)

(I) The Robot's Hardware

1. Electrical System Selection:

The motion controller (10) uses digital proceeding system—MSK2812 board of Hurricane Co Ltd (Beijing). The board's processor uses TI's TMS320F2812 DSP, 5V DC power supply.

Emulator of MSK2812 uses XDS510USB, USB2.0 interface. Servo drives use ACJ-55-18 of Copley Motion. Inclinometer (19) uses Crossbow's CXTA-02 dual-axis inclinometer. Gyro (20) uses Analog Device's ADIS16355 three-axis inertial navigation system.

Robot's drive motors (motor (12) of single wheel and motor (18) of flywheel) adopt Maxon's brushless DC motor kit EC32, 24V power supply, 80 W power, 190:1 planetary gear reducer—GP32C, motors with incremental photoelectric encoder accuracy in 500 lines.

Rechargeable battery module 9 uses LBS-100C standard lithium batteries, nominal voltage: 29.6V, the scope of work: 33.6V-24V, Nominal Capacity: 150 Wh, protection circuit: Built-in overcharge, over discharge, over-current and short circuit protection, integrated power control.

Power board 5 uses NORCO PW-4512 power supply module to provide the controller and other electronic equipment with power supply: input voltage: 16-40V DC, Output Voltage: ATX: +3.3V @5 A, +5V/+5 VSB @5 A, +12V @5 A, −12V@0.8 A.

2. Mechanical Structure and Layout of Electrical Components

The total weight of the robot is 8 kg, height 520 mm, width 300 mm, length 220 mm, diameter of 14 Single Wheel 210 mm. Robot's mechanical structure and electrical component placement are as follows:

As shown in FIG. 7, the entire robot aluminum frame is divided into base, waist, upper three layers. The column support structure facilitates the installation of various electronic devices and electrical components on the upper body. Various parts of the interface board are hollow and reinforced with a vertical ring structure of aluminum square plate. On the chest facade outside of the body, the acrylic plate fixes motion controller (10) and power board 9, the right of the body fixes flywheel servo drive controller 4. Vacated by the middle of plenty of space, pillars fix the install motor panels front and rear on the robot's upper body. The inertia flywheel components are installed in the center. The right facade of thoracic cavity fixes servo drivers of the shaft components using acrylic. The middle of the chest has diaphragm similar to the human (hollow and reinforced vertical ring structure, alloy square plate of reinforced aluminum). Waist and chest reinforcement plate fixes rechargeable battery module 9 (LBS-100C standard lithium batteries). The main fixed-base plate mounts inclinometer 19 and a gyroscope 20 in the center. The plate on the base fixes with debugging bracket 13. The debugging bracket 13 fixes with the four casters 15.

3. Electrical System Connection

Figure 5:
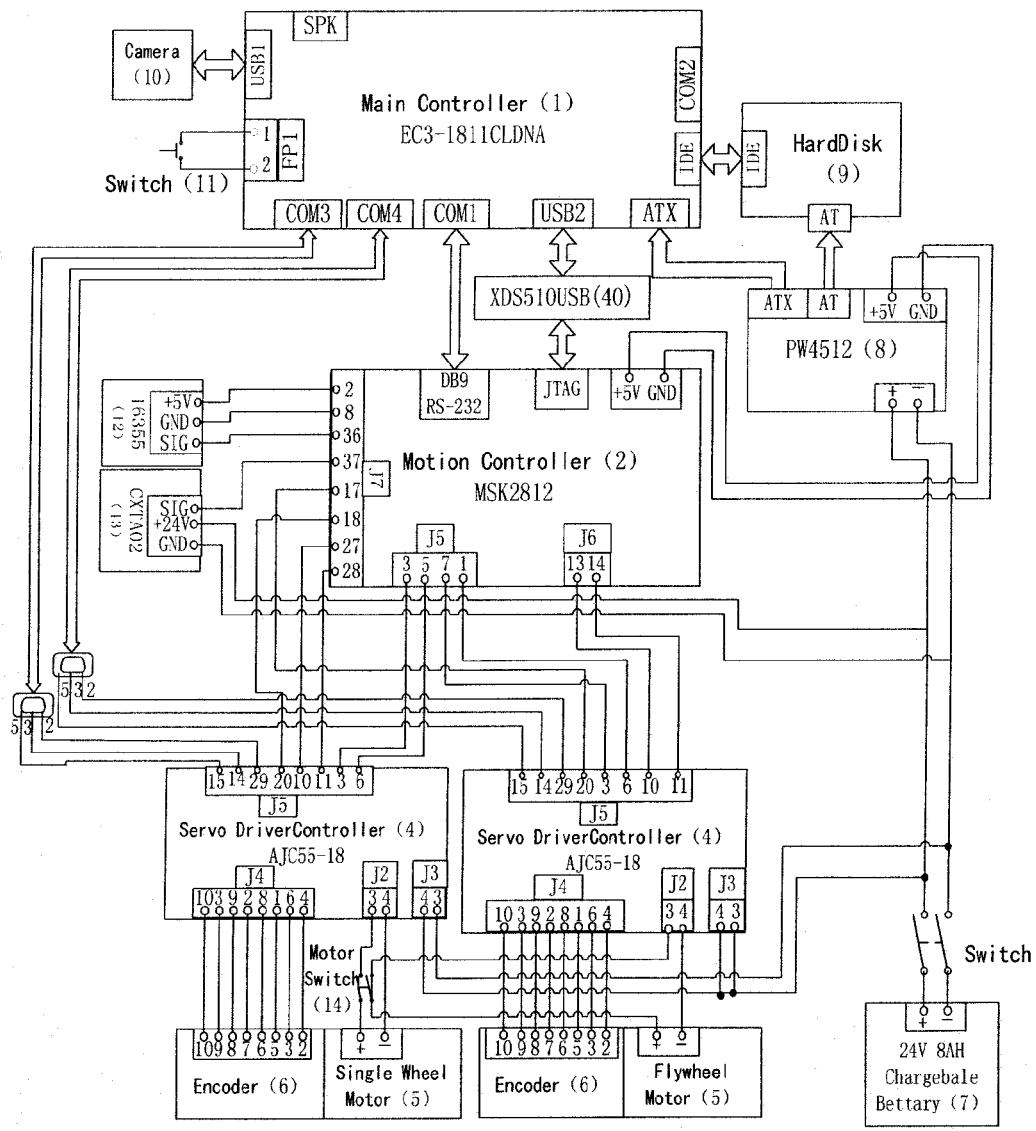
FIG. 5 is the single wheel robot minimum system wiring diagram of the electrical system.
Figure 6:
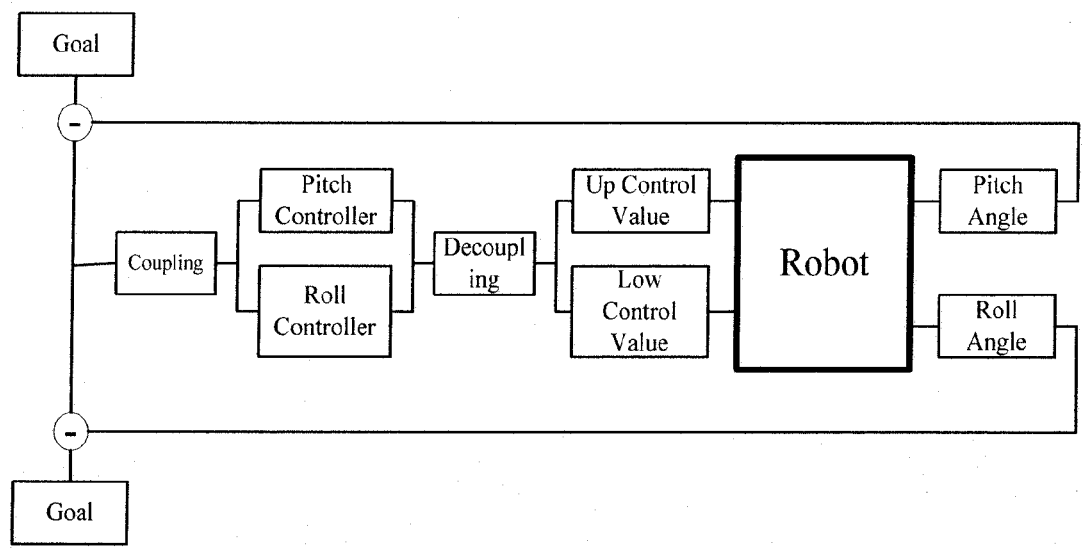
FIG. 6 is the single wheel robot motion control system block diagram.

As FIG. 5 shows, the connection of the various parts of the electrical system is as follows: MSK2812 board supply power by the PW-4512 power supply module +5 V output, its 36, 35 pins of J7 interfaces is A/D converter input pins, 38, 39 pins respectively connect with the inclinometer CXTA02 and gyro ADIS16355. The SPI instrument ADIS16355 gyroscope supplies by +5 V output of the J7 interface of MSK2812; inclinometer CXTA02 supplies by PW-4512 Power Supply Module 24V output pin.

The connection between MSK2812 with two servo drives ACJ-55-18 includes the control signals connections and encoder feedback signal pin. Control signals include motor enable signal, the direction signal of motor rotation and the amount of PWM signals of speed control. Which, the 3, 7 pin of J5 interface of MSK2812 respectively connect with 3-pin of the J5 interface of servo drives ACJ-55-18 for control of the flywheel, single wheel motor, as the enable signal line of the servo drive ACJ-55-18; 5 pin of the J5 interface of MSK2812, a foot flywheel and control, respectively connect with 6-pin of the J5 Interface of ACJ-55-18, as the motor rotation direction selection signal lines of single wheel motor; 17, 18 pin of J7 interfaces of MSK2812 for the PWM output, respectively connect with 20-pin of the J5 interface of flywheel and single wheel motor servo drives ACJ-55-18, as the speed control signal line. The feedback signals of flywheel and single wheel motor encoder pass through the servo drive ACJ-55-18, is sent to MSK2812 after the cache through the connection: 0, 11 pin of the J5 interfaces of the flywheel and single wheel motor servo drives ACJ-55-18 l respectively connect with 27, 28 pin of the J7 interfaces and 13, 14 pin of J6 interfaces of MSK2812.

3, 4 pin of two servo drives ACJ-55-18 in J3 interfaces is power input, respectively, connect with +24 V and GND of the power output; 3, 4 pin of J2 interface is the output voltage, respectively connect with the motor +/− input. Between 3 pin and motor+input a switch is fixed; 4, 6 pin of J4 interface as +5 V and GND respectively connect with the encoder cable 2, 3-pin. 1, 8, 2, 9, 3, 10 pin of J4 interface respectively is A channel of the encoder, B channel and zero common-mode input signals, respectively, connect with the cable of 5, 6, 7, 8, 9, 10 of the encoder.

The LBS-100C standard lithium battery connects with the PW-4512 power supply modules through a DPDT Rocker switch. The +/− input of PW-4512 Power Module connect to +/− line of LBS-100C standard lithium battery to provide DC output, respectively, connected to the supply side of the devices.

4. Electrical System Work Principles

Figure 3:
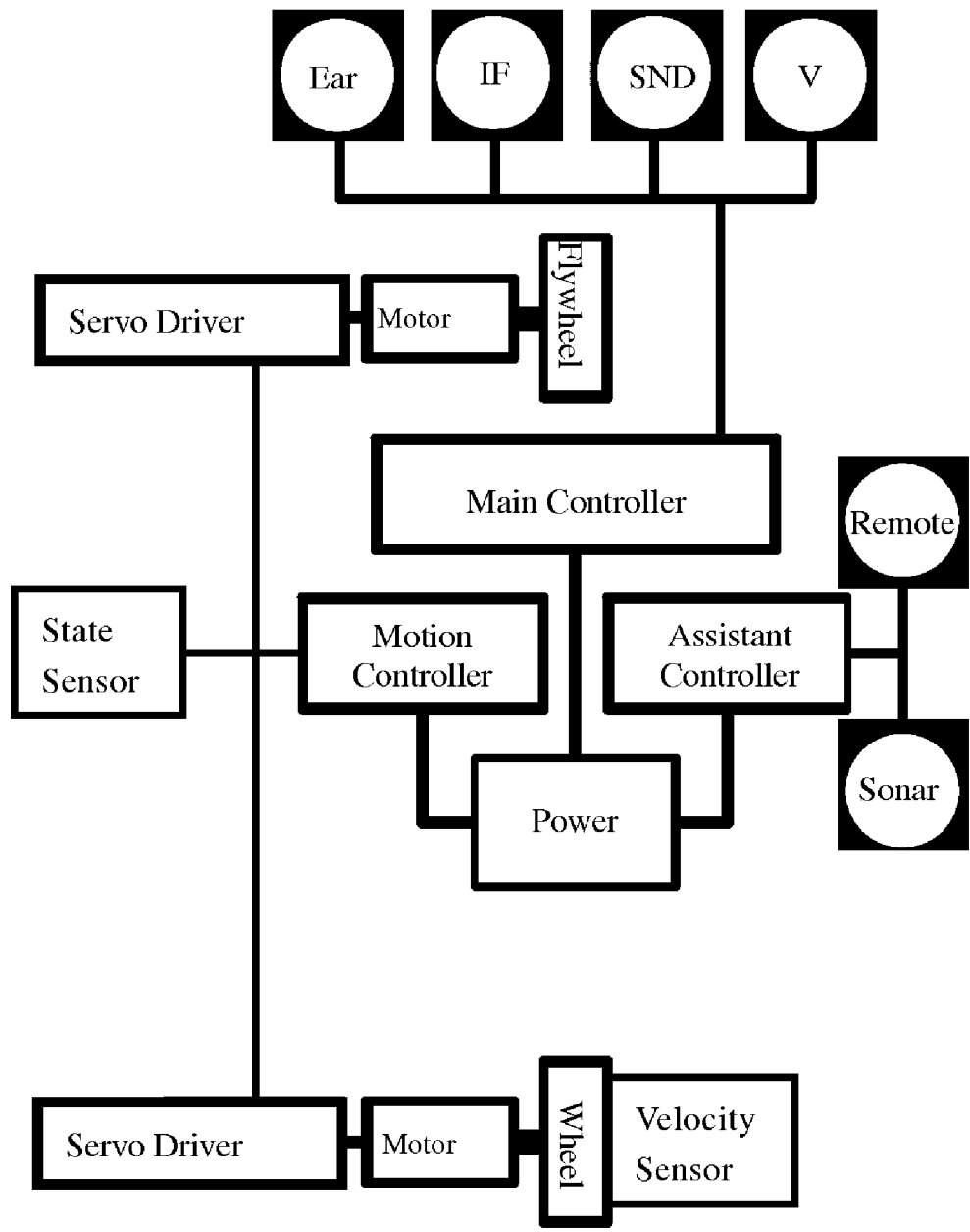
FIG. 3 is the single wheel robot electrical system schematic diagram.

Main function of the case is to maintain balance while to control the robot to achieve commanded motion. As a result, the robot electrical system works as shown in FIG. 3: Robot motion controller 10 reads the feedback signal of inclinometer 19 and gyroscope 20 and the encoder feedback signal through the servo drive controller, and then synthesizes such feedback signals with control commands to figure out the control value of the motors trough the motion balance control algorithm. Then send the corresponding PWM signal to the servo drive controller; Single Wheel servo motor drive controller 8 controls the single wheel motor 12; the single wheel motor 12 drives the single wheel 14 to rotate to maintain the balance of pitch. Servo drive controller 4 controls the flywheel motor 18 rotating the flywheel 17 to maintain balance of the roll.

(II) The Robot Motion Control System

The case of single wheel robot gives a mode control system of controlling forward motion and the software. Others such as the intelligent decision-making behavior, voice control operation; etc can refer to this case and be designed similarly with adding the appropriate hardware and software module.

The whole software of the control system consists of two parts, respectively, running on the motion controller 10 and the servo drive controller.

1. The Control Software in the Motion Controller (the Principle of FIG. 6)

The control software in the motion controller 10 is developed in the CCS studio, and downloaded in the storage unit. Procedures use 25 ms timer interrupt to achieve the robot posture balance and movement control in real-time. The implementation of the main program algorithm is given.

Other routines such as initialization are directly referred to TI's TMS320F2812 DSP manuals.

Proceedings do some necessary initialization to complete the variables and DSP registers initialization at first. The main configuration will be taken in the I/O ports and A/D channel, general purpose timers T1-T4, one cycle of the timer T1 for the interruption, T2, T4 for the encoder counters, T3 for the PWM signal output compare timer; and then open the PWM output to send to the servo drive controller enable signal; finally, to an infinite loop wait for interrupt arrival of each loop control procedures implemented in the detection and control algorithms;

When T1 timer expires 25 ms interrupt, DSP responses to the interrupt, save the current procedures for the scene, goes the timer interrupt program, the process (control program) are:

1. Close timer T1 interrupt, ready to start;
2. Obtain the information of all Encoders. Each encoder output signal is two sets of orthogonal coding sequence, the orthogonal encoder pulse circuit of DSP capture these two sets of signal. Rising and falling edges are counted. As a result the clock frequency is four times each input sequence. So after reading the values of the general-purpose timers T2 and T4, divide them by four, to get the number of encoder pulses output $n_u$, $n_d$ in a cycle;
3. Calculate the cumulated straight-line displacement of the robot and the linear speed: the angle of each wheel can be calculated by the information from the encoder during the cycle. Due to control cycle is very short (25 ms), the speed of wheels $\omega = \phi/T$ and the straight-line speed $V_x = \omega \cdot R/2$ of wheels can be approximately calculated. R stands for the wheel radius. Due to control cycle is very short, Multiply accumulate the product of $V_x$ and T of the this control cycles and the accumulated linear displacement, to the current accumulation of linear displacement can be acquired, that is $x(t)=x(t-T)+V_x T$;
4. The analog voltage signal is converted to digital by A/D converter. In order to avoiding the incidental factors, each of the signal are continuously sampled 10 times for A/D conversion. Remove the maximum of which and the minimum value, the average is assigned to the corresponding voltage variables: $U_{\theta_1}$, $U_1$, $U_{\theta_2}$, $U_2$. A degree of freedom is calculated on the inclination, through the formula: $\theta=(U_\theta-U_0)/S_2$. $\theta$ is the corresponding robot's tilt angle. $U_\theta$ is the calculated mean voltage. $U_0$ is a zero voltage, $S_2$ is the sensitivity of the inclinometer (19).
5. The inclination angle speed $\dot\theta$ can be obtained through the SPI.
6. The PWM duty cycle corresponding the torque of two control motor can be acquired through the motion control algorithms, the control command $X^C$ as a reference input; the x, $V_x$, $\theta_1$, $\dot\theta_1$, $\theta_2$, $\dot\theta_2$ as state feedback. The absolute value of the scope of torque: [0, 6] (Nm), corresponding to 0~100% duty cycle. When the duty is greater than zero the motor turns the positive. When the duty is less than zero the motor turns the negative.
7. Refresh the output of the PWM duty cycle to the servo drive and the motor rotation direction;
8. Set timer T1, re-start 25 ms timing, set T2, T4, re-start counting;
9. Open T1 interrupts, exit interrupt control procedure;

The algorithm of movement balance control of step 6 is as follows:

As shown in FIG. 10, the system uses a double-loop control structure: outside is the position (displacement) controller $K_1$. The controller $K_1$ calculates the amount of linear displacement control $U_X$ according to position error and the displacement control algorithm. $U_X$ as a control goal is passed to the inner loop—angle controller loop $K_2$. The controller $K_2$ uses the current pitch angle $\theta_1$, Pitch angle velocity $\dot\theta_1$ the current roll angle $\theta_2$ the current roll angle velocity $\dot\theta_2$, The control values of motor torque can be figured out as $[\tau_u, \tau_d]^T$ through the coupling control algorithm; Displacement controller applies PID control algorithm; angle controller also applies the widely used PID control algorithms. The whole control system constitutes a double-loop control structure.

Specific control algorithm process is as follows:

Establishes the robot mathematical model, according to the robot mechanical system characteristics and parameters. Linear state space equation can be acquired by linearization around the equilibrium point: $\dot X = AX+Bu$ Where $X=[\theta_2, \theta_1, \omega, \eta, \dot\theta_2, \dot\theta_1, \dot\omega, \dot\eta]^T$, $u=[\tau_d, \tau_u]^T$, $\theta_1$ for pitch angle; $\dot\theta_1$ for pitch angle velocity; $\theta_2$ for roll angle; $\dot\theta_2$ for roll angle velocity, $\omega$ for the wheel rotation angle, $\dot\omega$ for the wheel rotation angular velocity, $\eta$ for the inertia flywheel (17) rotation angle, $\dot\eta$ for the inertia flywheel (17) angular velocity.

$$A = \begin{bmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 24.9770 & 0 & 0 & 0 & 0 & 0 & 0 & 0 \\ 0 & 60.9590 & 0 & 0 & 0 & 0 & 0 & 0 \\ 0 & -108.3715 & 0 & 0 & 0 & 0 & 0 & 0 \\ -24.9770 & 0 & 0 & 0 & 0 & 0 & 0 & 0 \end{bmatrix}$$

$$B = \begin{bmatrix} 0 & 0 \\ 0 & 0 \\ 0 & 0 \\ 0 & 0 \\ 0 & -1.4159 \\ -14.3988 & 0 \\ 40.4128 & 0 \\ 0 & 134.7493 \end{bmatrix}$$

That the system is completely controllable can be proved through the control matrixes of the pitching motion subsystem and roll movement subsystems are full rank. The value of each state variable of the system can also be measured.

By decoupling control theory, the whole robot system control tasks can be decomposed into pitch degree of freedom to control and roll degree of freedom to control. And therefore, $\theta_u^C$, $\theta_d^C$ is reference input for the two subsystems, respectively, the state $\theta_i$, $\dot\theta_i$ (i=u,d;), That is the inclination of two DOF as the feedback of the balance control system. The two inner angle control subsystem of the state feedback controller can be designed by PID control method: PID control parameters can be acquired by the critical shock method. As:

$$\text{Tilt inner degrees of freedom control} \begin{cases} K_p^u = 6000 \\ K_i^u = 3 \\ K_d^u = 5200; \end{cases}$$

-continued $$\text{Roll degrees of freedom control} \begin{cases} K_p^d = 20000 \\ K_i^d = 3 \\ K_d^d = 20000 \end{cases}$$

The PID control parameters of the robot outside the closed-loop displacement control can be obtained in the same method:

$$\text{Outer } X(\text{distance}) \text{ control} \begin{cases} K_p^x = 0.02 \\ K_i^x = 0 \\ K_d^x = 0.148; \end{cases}$$

So as to constitute the entire control system, the control objective is to move forward 10 meters, that is, in FIG. 16 the control objective is to go to 10 meters (10 meters straight line), the inclination of the robot during the control process is shown in FIG. 15, the actual displacement shown in FIG. 16 as the curve pass through (0, 0) point.

2. Servo Drive Controller Software

The servo drive ACJ-55-18 supporting PC-side software COPLEY MOTION2, automatically calculate the DC motor servo program PI regulator parameters according to input parameters. The servo-control procedures is automatically generated after the simple structure of control system setting and downloaded to the storage unit of ACJ-55-18 through the serial port. The servo process control cycle is 1 ms. Signals of DSP-output PWM and turn were motor reference torque and reference shift. The armature current is negative feedback. The overall control loop of motor torque is PID servo control.

(III) The Application of Robotic Systems

Applying the robot, can follow these steps:
1. Installation of Hardware
2. Installation of electrical system
3. Confirming that the hardware and electrical system is connected correctly.
4. All switches should be off at first.
5. Balance the robot to an upright position.
6. Turn the switches on, the robot begins balance control.
7. After Robot in the stable state, no longer support.
8. Support the robot before turning off motor switches, the main power switch.
9. Place the robot to a cool, desiccate and safe depositary out of children's reach.

What is claimed is:

1. A single wheel robot system, including a mechanical body and a control system;

the mechanical body including a metal frame rigid body, a modular robotic head and neck which comprises two-dimensional PTZ, and a detachable robot arm, an end of the detachable arm being a multi-fingered robot hand; wherein upper balance components and lower balance components constitute a balance control structure, the lower balance components include a balanced single wheel and a single wheel motor, the upper balance components include an inertia flywheel and a flywheel motor;

the control system comprising state sensors, a motion controller and two servo-drive controllers and a power supply system, wherein the state sensors include attitude sensors and speed sensors; the motion controller receives a signal from the state sensors and, then, issues a control instruction through a control procedure and the signal; the two servo-drive controllers receive the control instruction and, respectively, through the single wheel motor and the flywheel motor, control rotation of the single wheel and the inertia flywheel to balance the robot;

wherein a shaft of the inertia flywheel is pointing at forward and backward direction; an adjustable debugging support is designed around the single wheel, all around the debug support is a removable caster.

2. The single wheel robot system of claim 1, wherein the attitude sensor is an inclinometer or a gyroscope; the speed sensor is encoders installed on the single wheel motor and the flywheel motor; the motion controller is a MTS2812 digital signal processor card; the servo-drive controller is an ACJ-55-18 servo drive; the power supply system comprises a power supply board and a rechargeable Lithium batteries module.

3. The single wheel robot system of claim 2, wherein the gyroscope has a temperature sensor for temperature compensation.

4. The single wheel robot system of claim 1, wherein the attitude sensor is an inclinometer or a gyroscope; the speed sensor is encoders installed on the single wheel motor and the flywheel motor; the motion controller is a MTS2812 digital signal processor card; the servo-drive controller is an ACJ-55-18 servo drive; the power supply system comprises a power supply board and a rechargeable Lithium batteries module.

5. The single wheel robot system of claim 4, wherein the gyroscope has a temperature sensor for temperature compensation.

6. The single wheel robot system of claim 4, wherein perception sensors installed in the robot's head are a dual-camera vision sensor, MIC constituting a hearing sensors and infrared sensors located between the pairs of cameras, and sonar sensors installed in the robot waist, remote control receiver; an auxiliary microcontroller (MCU) receives signals from sonar sensors, remote control sender and embedded computer (EPC) system receives signals from the vision sensor, the infra-red sensor and the auditory sensor; the main controller-EPC can receive information of the motion controller-DSP and auxiliary controller-MCU information, and provide control instructions for the motion controller and pass voice command the speaker.

* * * * *